United States Patent
Park et al.

(10) Patent No.: US 8,213,965 B2
(45) Date of Patent: Jul. 3, 2012

(54) METHOD OF PAGING IN A WIRELESS COMMUNICATION SYSTEM

(75) Inventors: Gi Won Park, Anyang-si (KR); Ki Seon Ryu, Sungnam-si (KR); Yong Ho Kim, Incheon-si (KR)

(73) Assignee: LG Electronics Inc., Seoul (KR)

(*) Notice: Subject to any disclaimer, the term of this patent is extended or adjusted under 35 U.S.C. 154(b) by 100 days.

(21) Appl. No.: 12/831,200

(22) Filed: Jul. 6, 2010

(65) Prior Publication Data
US 2011/0003603 A1    Jan. 6, 2011

Related U.S. Application Data

(60) Provisional application No. 61/227,799, filed on Jul. 23, 2009, provisional application No. 61/223,681, filed on Jul. 7, 2009, provisional application No. 61/223,367, filed on Jul. 6, 2009.

(30) Foreign Application Priority Data
Oct. 13, 2009  (KR) .................. 10-2009-0097301

(51) Int. Cl.
*H04W 68/00* (2009.01)
(52) U.S. Cl. ......... 455/458; 455/450; 455/509; 370/329

(58) Field of Classification Search .................. 455/458, 455/450, 451, 452.1, 509–511; 370/329
See application file for complete search history.

(56) References Cited

U.S. PATENT DOCUMENTS

| | | | |
|---|---|---|---|
| 7,711,377 B2* | 5/2010 | Laroia et al. | 455/458 |
| 2005/0250474 A1 | 11/2005 | Hong et al. | |
| 2005/0277429 A1 | 12/2005 | Laroia et al. | |
| 2008/0146253 A1* | 6/2008 | Wentink | 455/458 |
| 2008/0188247 A1* | 8/2008 | Worrall | 455/458 |
| 2009/0303953 A1* | 12/2009 | Kang et al. | 370/329 |
| 2010/0220641 A1* | 9/2010 | Son et al. | 370/311 |

FOREIGN PATENT DOCUMENTS
EP  2031891   3/2009
JP  2003339081   11/2003
* cited by examiner

*Primary Examiner* — Raymond Dean
(74) *Attorney, Agent, or Firm* — Lee, Hong, Degerman, Kang & Waimey

(57) ABSTRACT

A method of paging in a wireless communication system is disclosed. In the method, a base station generates a paging advertisement message that includes a paging group ID bitmap indicating whether there are any mobile stations that perform paging for each of paging groups that include the base station, and transmits the paging advertisement message to the mobile stations.

20 Claims, 3 Drawing Sheets

METHOD OF PAGING IN A WIRELESS COMMUNICATION SYSTEM

CROSS REFERENCE TO RELATED APPLICATIONS

This application claims the benefit of earlier filing date and right of priority to the Korean Patent Application No. 10-2009-0097301, filed on Oct. 13, 2009, and also claims the benefit of U.S. Provisional Application Ser. Nos. 61/227,799, filed on Jul. 23, 2009, 61/223,681, filed on Jul. 7, 2009, and 61/223,367, filed on Jul. 6, 2009, the contents of which are all incorporated by reference herein in their entirety.

BACKGROUND OF THE INVENTION

1. Field of the Invention

The present invention relates to a wireless communication system, and more particularly, to a method of paging in a wireless communication system.

2. Discussion of the Related Art

First of all, an idle mode of a mobile station and a paging group will be described.

A broadband wireless access system supports an idle mode to minimize power consumption of a mobile station. The idle mode means that a mobile station can receive downlink (DL) broadcast traffic even though it is not subscribed to a specific base station when moving at a wireless link environment where multiple base stations are provided.

The mobile station does not need to perform a handoff procedure during an idle mode when moving between base stations included in a paging zone. In this case, the mobile station is not required to transmit uplink information for the handoff procedure, whereby power consumption can be reduced.

The paging zone means a zone covered by a paging group that includes a plurality of base stations, and paging means a function for identifying location (for example, any base station or any exchange station) of a mobile station when a call signal is generated. At this time, a paging group represents a logical group. The paging group is intended to provide a downlink with a neighboring zone that can be paged, if there is any traffic decided to target the mobile station.

The paging group can include one or more base stations. Also, one base station can be included in one or more paging groups. The paging group is defined by a management system. The paging group can use a paging group-action backbone network message. Also, a paging controller can manage a list of mobile stations, which are in an idle mode, by using a paging announcement message which is one of backbone network messages, and can manage initial paging of all base stations that belong to a paging group.

If the mobile station asks the base station to switch it to the idle mode, the base station can switch the mobile station to the idle mode by forwarding its paging group ID to the mobile station.

Next, a paging procedure according to the related art will be described.

If a call or packet of the mobile station is transmitted to the paging controller while the mobile station is being in the idle mode, the paging controller transmits a paging message to all base stations within the paging group, and the base stations within the paging group, which have received the paging message, broadcasts a paging advertisement message to mobile stations managed by them. The mobile station determines whether to shift to a normal mode or remain in the idle mode by receiving the paging advertisement message, which is transmitted from the base station, for an available interval.

Namely, if the paging controller pages the mobile station, the mobile station enters the normal mode and performs communication with the base station.

However, a problem occurs in that the mobile station should receive the paging message per paging offset even in the case that there is no paging message transmitted to the mobile station. This could lead to power consumption.

SUMMARY OF THE INVENTION

As described above, a paging method according to the related art has a problem in that power of a mobile station is consumed.

Accordingly, the present invention is directed to a method of paging in a wireless communication system, which substantially obviates one or more problems due to limitations and disadvantages of the related art.

An object of the present invention is to provide a paging method that can reduce overhead caused by paging information while reducing power consumption of a mobile station.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a paging method of a base station in a wireless communication system according to the present invention comprises generating a paging advertisement message that includes a paging group ID bitmap indicating whether there are any mobile stations that perform paging for each of paging groups that include the base station; and transmitting the paging advertisement message to the mobile stations.

In another aspect of the present invention, a paging method of a mobile station in a wireless communication system comprises entering an idle mode; and receiving a paging advertisement message that includes a paging group ID bitmap indicating whether there are any mobile stations that perform paging for each of paging groups that include a base station.

At this time, the paging advertisement message further includes a field indicating the number of mobile stations paged for each of the paging groups that include mobile stations, which perform paging, among the paging groups that include the base station.

Also, the paging advertisement message further includes information of each of mobile stations paged for each of the paging groups that include mobile stations, which perform paging, among the paging groups that include the base station.

Furthermore, the information of each of the mobile stations includes an action code field indicating action requested from the base station to each of the mobile stations.

Moreover, the paging advertisement message further includes an extension flag field indicating whether a listening interval has been extended.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings, so that a person with an ordinary skill in the art to which the present invention pertains can easily carry out the embodiments. However, it is to be understood that various modifications can be made in the present invention and the present invention is not limited to the following description. In order to clarify the present invention, parts which are not related with the description will be omitted from the drawings, and wherever possible, the same reference numbers will be used throughout the drawings to refer to the same or like parts.

In the description, when some part "includes" some elements, it means that the part can further include other elements unless mentioned to the contrary. Also, terminologies " . . . part," " . . . block," and " . . . module" described herein mean a unit processing at least one function or operation, and can be implemented by hardware, software or combination of hardware and software.

First of all, an idle mode entry procedure and a paging procedure of a mobile station in a wireless communication system will be described with reference to FIG. 1.

Figure 1:
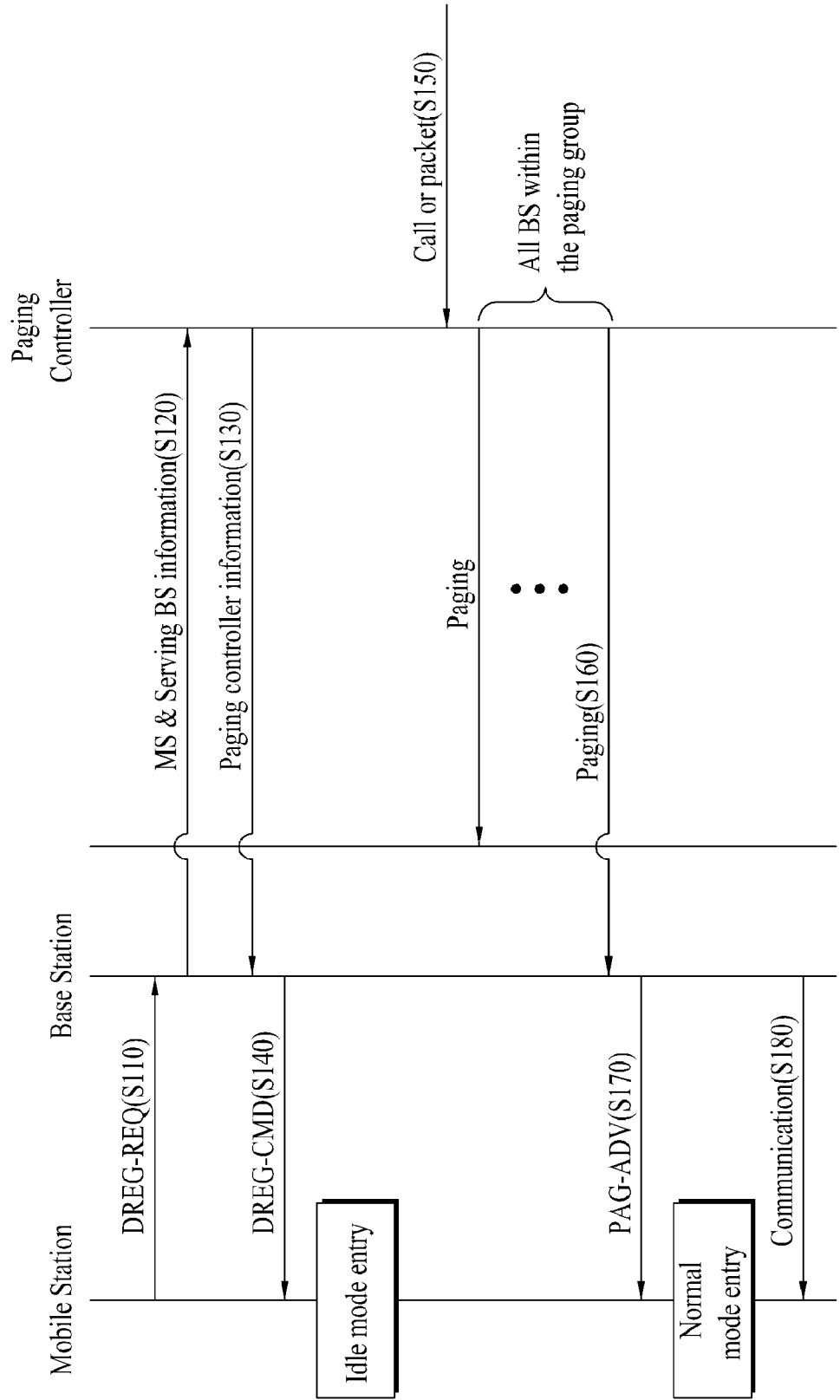
FIG. 1 is a diagram illustrating an idle mode entry procedure and a paging procedure of a mobile station in a wireless communication system.

FIG. 1 is a diagram illustrating an idle mode entry procedure and a paging procedure of a mobile station in a wireless communication system.

In an idle mode, paging can be performed in a unit of paging group. For example, a mobile station can belong to one or a plurality of paging groups. If a call or a user packet enters a paging controller of each paging group, wherein the user packet is transmitted from an external network to the mobile station, the paging controller performs paging to search for a mobile station. At this time, the paging controller transfers a paging message to all base stations within a paging group, and a base station, which has received the paging message, performs paging by broadcasting a paging advertisement (MOB_PAG-ADV) message to the mobile station.

Referring to FIG. 1, the mobile station transmits a deregistration request (hereinafter, referred to as "DREG-REQ") message to a base station currently in service to enter an idle mode from a normal mode (S110).

The base station, which has received the DREG-REQ message, transmits mobile station information and base station information to the paging controller (S120). Examples of the mobile station information include mobile station identifier and MAC address of the mobile station. An example of the base station information includes base station identifier.

The paging controller transmits paging controller associated information to the base station (S130).

The base station transmits a deregistration command (hereinafter, referred to as "DREG-CMD") message to the mobile station in response to the deregistration request message (S140). The DREG-CMD message can include paging group ID, paging offset, paging message offset, and paging listening interval.

The paging group ID is ID of a paging group, which is allocated from the base station to the mobile station. The paging offset means the time when the mobile station monitors the paging message transmitted from the paging group.

The paging message offset is the time when the mobile station receives the paging message transmitted from the paging group during a listening interval.

The mobile station which has identified the deregistration command message enters the idle mode. The mobile station which is in the idle mode can receive the paging message based on paging information received through the deregistration command message.

If a call or packet of the mobile station is transmitted to the paging controller while the mobile station is being in the idle mode (S150), the paging controller transmits the paging message to all base stations within the paging group (S160). Then, the base stations within the main paging group, which have received the paging message, broadcast a paging advertisement (PAG-ADV) message to the mobile stations managed by them (S170), and the mobile station identifies and enters the normal mode to perform communication with the base station (S180).

Figure 2:
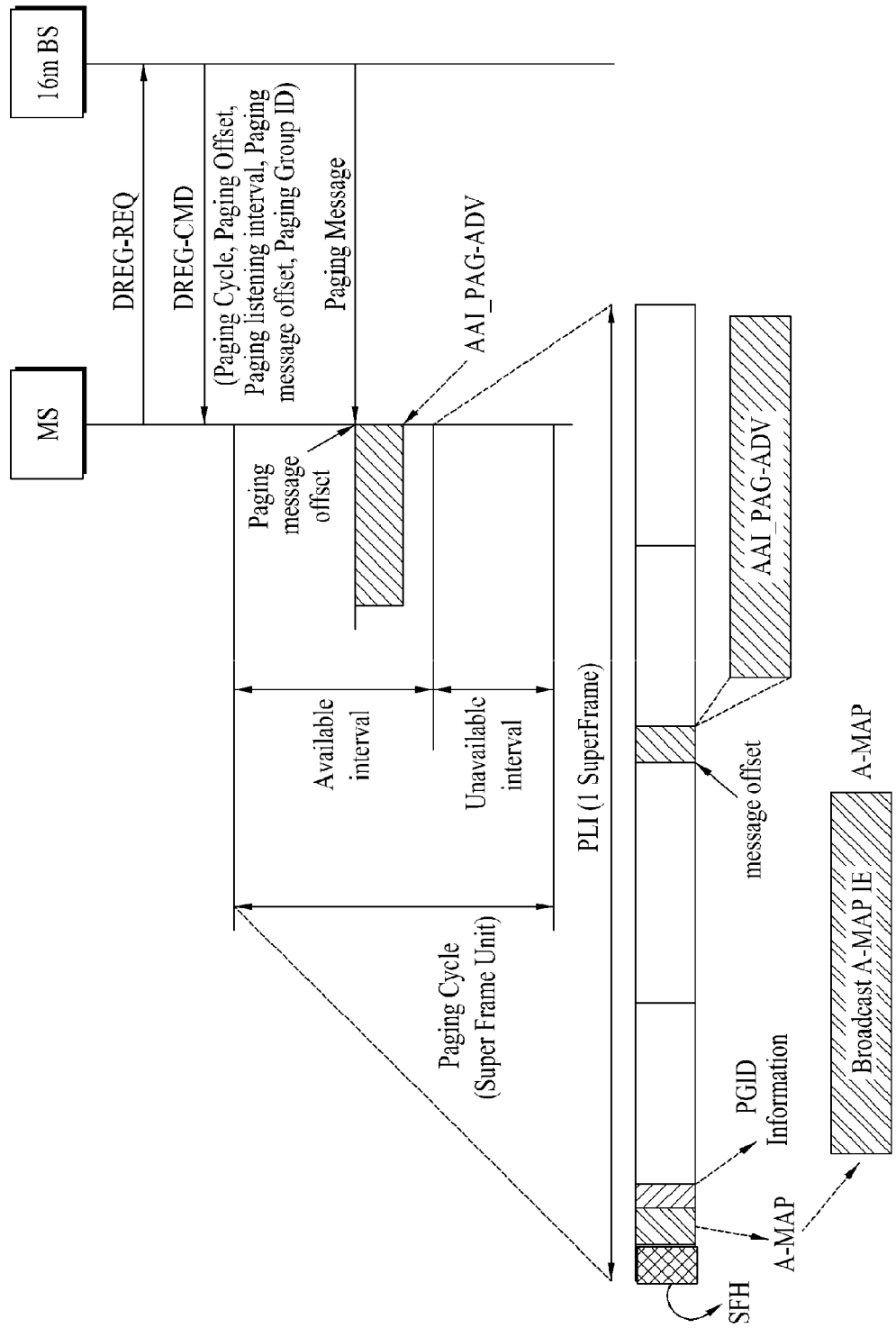
FIG. 2 is a diagram illustrating a paging method of a mobile station in a wireless communication system according to the embodiment of the present invention.

Next, a paging method of a mobile station in a wireless communication system according to the embodiment of the present invention will be described. FIG. 2 is a diagram illustrating a paging method of a mobile station in a wireless communication system according to the embodiment of the present invention.

As illustrated in FIG. 2, the mobile station receives paging group ID (PGID) information and paging advertisement message from the base station for a paging listening interval.

The base station notifies the mobile station whether to transmit paging group ID information, through a broadcast A-MAP ID. If the base station indicates transmission of the paging group ID information, the paging group ID information is transmitted after A-MAP.

The paging group ID information can include at least one or more paging group Ids, a paging indicator bitmap, and a paging indicator usage flag. The paging group IDs are IDs of paging groups to which the base station that transmit paging group ID information belongs. The mobile station can identify whether it has moved to another paging group zone, by identifying paging group IDs.

The paging indicator bitmap represents whether each frame included in a corresponding super frame includes the paging message. For example, if one super frame includes four frames, the paging indicator bitmap can be represented by 4 bits. If the third frame only includes the paging message, the paging indicator bitmap is represented by '0010'.

For example, if the mobile station is allocated with the third frame of the paging message offset through the deregistration command message, it identifies the third bit of the paging indicator bitmap for the paging listening interval. If the third bit of the paging indicator bitmap is set to 1, the mobile station identifies the paging message from the third frame. If the third bit of the paging indicator bitmap is set to 0, the mobile station determines that there is no paging message transmitted thereto and does not identify the paging message from the third frame.

The paging indicator usage flag represents whether the paging group ID information includes the paging indicator bitmap. Namely, if the paging indicator usage flag is set to 1, the paging group ID information includes the paging indicator bitmap. If the paging indicator usage flag is set to 0, the paging group ID information does not include the paging indicator bitmap.

The paging group ID information may or may not include the paging indicator bitmap and the paging indicator usage flag.

Table 1 illustrates a format of the paging group ID information if the paging group ID information includes the paging indicator bitmap and the paging indicator usage flag while Table 2 illustrates a format of the paging group ID information if the paging group ID information does not include the paging indicator bitmap and the paging indicator usage flag.

TABLE 1

| Syntax | Size (bits) | Notes |
| --- | --- | --- |
| Format of PGID information( ){ | — | — |
| Num_ PGIDs | 3 | Number of paging group IDs |
| Paging indicator usage flag | 1 | 0: Paging indicator bitmap is not included.<br>1: Paging indicator bitmap is included. |
| for(i=0;i<Num_PGIDs;i++) { | — | — |
|    PG ID | 16 | Paging group identifier |
| } | — | — |
| if (Paging indicator usage flag==1) { | — | — |
| Paging indicator bitmap | 4 * Number of PGIDs | The paging indication bitmap size is 4 bit and is assigned per paging group. Each bit refers to a frame within a super frame and indicates the presence of the AMS's paging message within the frame.<br>0x00: If this bit is set to 1, AMS's paging message is transmitted in $1^{st}$ frame during the paging listening interval (1 superframe).<br>0x01: If this bit is set to 1, AMS's paging message is transmitted in $2^{nd}$ frame during the paging listening interval (1 superframe).<br>0x02: If this bit is set to 1, AMS's paging message is transmitted in $3^{rd}$ frame during the paging listening interval (1 superframe).<br>0x03: If this bit is set to 1, AMS's paging message is transmitted in $4^{th}$ frame during the paging listening interval (1 superframe). |
| } | — | — |
| } | — | — |

TABLE 2

| Syntax | Size (bits) | Notes |
| --- | --- | --- |
| Format of PGID information( ){ | — | — |
| Num_ PGIDs | 3 | Number of paging group IDs |
| for(i=0;i<Num_PGIDs;i++) { | — | — |
|    PG ID | 16 | Paging group identifier |
| } | — | — |
| } | — | — |

As illustrated in FIG. 2, the mobile station receives the paging advertisement message from the base station during the paging message offset of the paging listening interval.

Table 3 illustrates the paging advertisement message if the paging group ID information includes the paging indicator bitmap due to the paging indicator usage flag set to 1, and Table 4 illustrates the paging advertisement message if the paging group ID information does not include the paging indicator bitmap due to the paging indicator usage flag set to 0, or if the paging group ID Information does not include the paging indicator usage flag and the paging indicator bitmap as illustrated in Table 2.

TABLE 3

| Syntax | Size(bit) | Notes |
| --- | --- | --- |
| AAI_PAG-ADV_Message format ( ) { | | |
| Management Message Type = TBD | 8 | AAI_PAG-ADV message |
| for (i = 0; i < Num_Positive_Paging_Group_IDs; i++) { | — | Num_Postive_Paging_Group_IDs is the number of bits set to one in the Paging indicator bitmap |
| Num_AMSs | 8 | Number of paged AMSs |
| for(j=0; j<Num_AMS; j++;) { | | |
| temporary identifier | TBD | Temporary Identifier of the AMS |
| Action Code | 2 | Paging Action instruction to AMS<br>0b00 = Perform network re-entry<br>0b01 = Perform ranging to establish location<br>0b10 = Perform LBS measurement<br>0b11 = Reserved |
| } | | |
| } | | |
| Extension Flag | 1 | Extension flag is used to indicate the presence of other paging message in the subsequent frame.<br>0: Current paging message is last paging message within paging listening |

TABLE 3-continued

| Syntax | Size(bit) | Notes |
|---|---|---|
| | | interval. |
| | | 1: Other paging message is transmitted in the subsequent frame. |
| } | | |

TABLE 4

| Syntax | Size (bit) | Notes |
|---|---|---|
| AAI_PAG-ADV_Message_format( ) { | — | — |
|   Management Message Type = TBD | 8 | — |
|   Paging_Group_IDs bitmap | variable | The size of Paging_Group_IDs bitmap is the number of paging group IDs in the PGID info message, each bit in the bitmap indicates:<br>0: the paging information for the corresponding PGID is not included<br>1: the paging information for the corresponding PGID is included |
|   For (i = 0; i < Num_Postive_Paging_Group_IDs; i++) { | — | Num_Postive_Paging_Group_IDs is the number of bits set to one in the Paging_Group_IDs bitmap |
|     Num_AMSs | 8 | Number of paged AMSs |
|     For (j = 0; j < Num_AMSs; j++) { | — | — |
|       Temporary Identifier | 10 | Temporary identifier, paging cycle, and paging offset are used to uniquely identify an AMS in the idle mode in a particular paging group |
|       Paging Cycle | 4 | Paging cycle consists of paging unavailable and paging available interval |
|       Action Code | 2 | Paging Action instruction to AMS<br>0b00 = Penetwork re-entry<br>0b01 = Perform ranging to establish location<br>0b10 = Perform LBS measurement<br>0b11 = Reserved |
|     } | — | — |
|   } | — | — |
|   Extension Flag | 1 | 0 = There is no remaining part of this paging message<br>1 = The remaining part of this paging message will be transmitted in the subsequent frame or sub-frame |
| } | — | — |

As illustrated in Table 4, if the paging group ID information does not include the paging indicator bitmap due to the paging indicator usage flag set to 0, or if the paging group ID Information does not include the paging indicator usage flag and the paging indicator bitmap as illustrated in Table 2, the paging advertisement message includes paging group ID bitmap (Paging_Group_IDs bitmap).

The paging group ID bitmap indicates whether there are any mobile stations that perform paging for each of paging groups that include the base station. The size of the paging group ID bitmap is the same as the number of paging groups (Num_PGIDs) of the paging group information, which is the number of paging groups that include the base station. For example, if the number of paging groups to which the base station belongs is 4, the size of the paging group ID bitmap is 4, wherein each bit indicates whether there is any mobile station, which is paged, among mobile stations belonging to each of paging groups. If there is any mobile station that is paged, the corresponding bit is set to 1. If there is no mobile station that is paged, the corresponding bit is set to 0.

In Table 3 and Table 4, Num_Positive_Paging_Group_IDs means the number of paging groups that include the mobile station, which performs paging, among paging groups to which the base station belongs. Namely, if the paging advertisement message is provided as illustrated in Table 4, Num_Positive_Paging_Group_IDs is the same as the number of bits set to 1 in the paging group ID bitmap.

If the paging advertisement message is provided as illustrated in Table 3, Num_Positive_Paging_Group_IDs is the same as the number of paging groups in which at least one of four bits of the paging group ID bitmap of Table 1 is not 0. For example, if the number of paging groups to which the base station belongs is 4, the paging group ID information includes four paging indicator bitmaps (4 bits). At this time, 4 bits corresponding to one paging group are all 0, and if each of 4 bits corresponding to the other three paging groups is set to 1, the number of Num_Positive_Paging_Group_IDs is 3.

The paging advertisement message includes the number (Num_AMSs) of mobile stations paged for each of the paging groups that include the mobile stations, which perform paging, among the paging groups to which the base station belongs.

Also, the paging advertisement message can include a temporary identifier (ID), a paging cycle, and action code of each of the mobile stations paged for the paging groups that include the mobile stations, which perform paging, among the paging groups to which the base station belongs.

The action code represents action requested from the base station to the mobile station. Namely, as illustrated in Table 3 and Table 4, '0b000' represents action that requests network reentry of the mobile station, '0b01' represents action that requests location update of the mobile station, and '0b10' represents action that requests LBS measurement of the mobile station.

An extension flag represents whether the listening interval has been extended. If the base station fails to transmit all of the paging messages for the listening interval, it extends the listening interval and transmits the other part of the paging messages. Accordingly, if the extension flag is set to '1', the mobile station receives the paging message by extending the listening interval and monitoring continuous frames. After completely receiving the paging message, the mobile station ends the listening interval.

Figure 3:
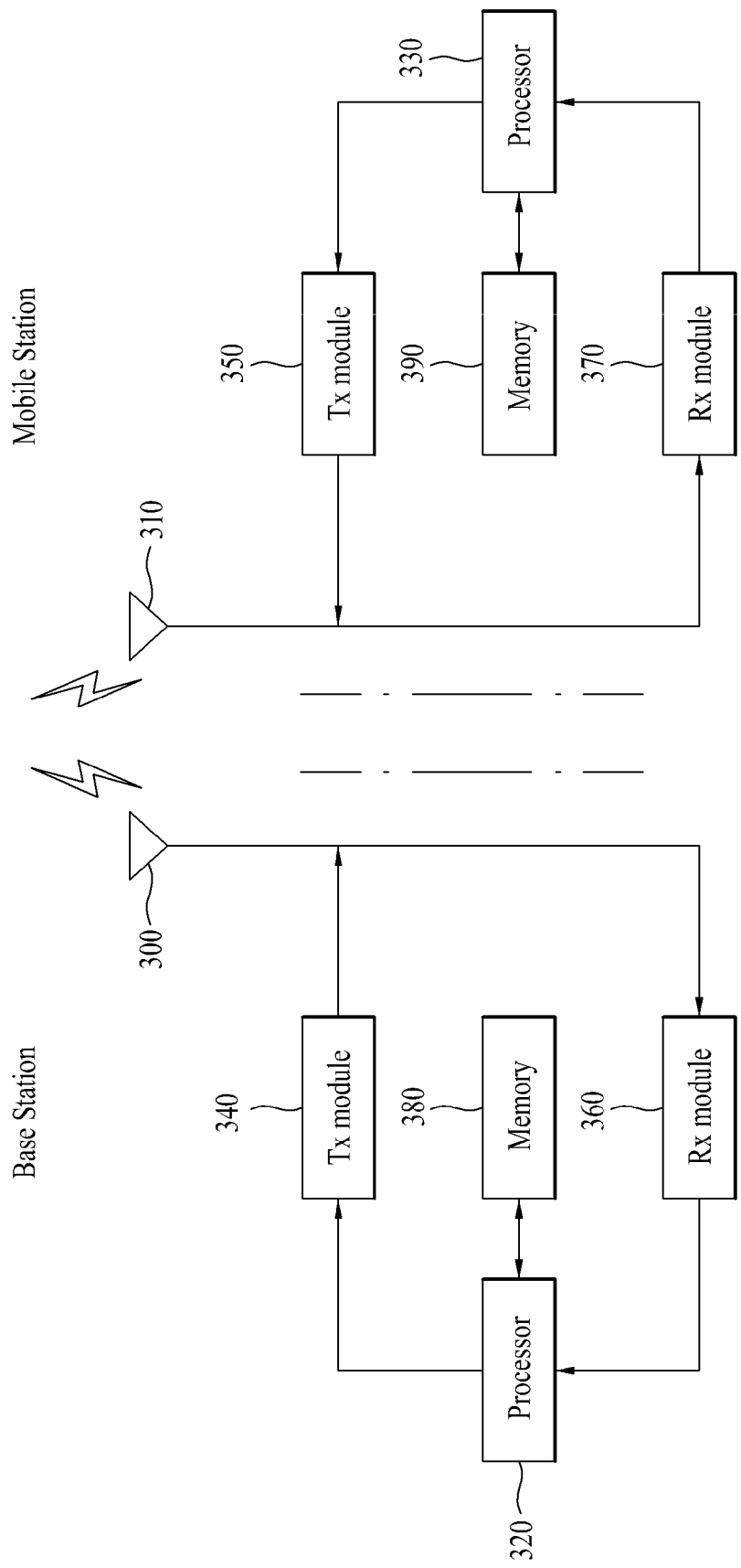
FIG. 3 is a diagram illustrating a mobile station and a base station through which the embodiments of the present invention can be carried out.

FIG. 3 is a diagram illustrating a mobile station and a base station through which the aforementioned embodiments of the present invention can be carried out.

Each of the mobile station (AMS) and the base station (ABS) includes an antenna 300, 310 for transmitting and receiving information, data, signal and/or message, a Tx module 340, 350 for transmitting the message by controlling the antenna, and an Rx module 360, 370 for receiving the message by controlling the antenna, a memory 380, 390 for storing information related to communication with the base station, and a processor 320, 330 for controlling the Tx module, the Rx module and the memory. At this time, the base station could be a femto base station or a macro base station.

The antenna 300, 310 serves to transmit a signal generated by the Tx module 340, 350 to the outside or receive a radio signal from the outside to transfer the radio signal to the Rx module 30, 370. If a MIMO function is supported, two or more antennas may be provided.

The processor 320, 330 generally controls the whole operation of the mobile station or the base station. In particular, the processor can perform a controller function for performing the aforementioned embodiments of the present invention, a medium access control (MAC) frame variable control function according to service characteristics and radio wave condition, a handover function, an authentication and encryption function, etc. Also, the processor 320, 330 can further include an encoding module for controlling encoding of various messages, and a timer module for controlling transmission and reception of various messages.

The processor 320 of the base station generates the paging advertisement message that includes paging group ID bitmap representing whether there are any mobile stations, which perform paging for each of the paging groups that include the base station.

The paging advertisement message can further include at least one or more of a field indicating the number of mobile stations paged for each of the paging groups that include mobile stations, which perform paging, among the paging groups that include the base station, information of each of the mobile stations paged for each of the paging groups that include mobile stations, which perform paging, among the paging groups that include the base station, and an extension flag field indicating whether the listening interval has been extended.

The processor 330 of the mobile station sets the mobile station to the idle mode. If the paging advertisement message is received from the base station, the processor 330 of the mobile station can set the mobile station to the normal mode in accordance with the paging advertisement message.

The Tx module 340, 350 performs predetermined coding and modulation for signal and/or data, which are scheduled from the processor and then transmitted to the outside, and then transfers the coded and modulated data to the antenna 300, 310.

The Tx module 340 of the base station broadcasts the paging advertisement message to the mobile stations.

The Rx module 360, 370 performs decoding and demodulation for the radio signal received from the outside through the antenna 300, 310 to recover original data and then transfer the recovered data to the processor 320, 330.

The Rx module 370 of the mobile station receives the paging advertisement message from the base station.

The memory 380, 390 may store a program for processing and control of the processor, or may perform a function for temporarily storing input/output data (in case of the mobile station, uplink (UL) grant allocated from the base station, system information, station identifier (STID), flow identifier (FID), action time, zone allocation information, and frame offset information).

Also, the memory 380, 390 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

According to the embodiments of the present invention, the following advantages can be obtained.

The base station notifies the mobile station whether there is any mobile station that performs paging for each of paging groups that include a base station, by using paging group ID, whereby power consumption of the mobile station can be reduced.

It is to be understood that the effects that can be obtained by the present invention are not limited to the aforementioned effects, and another effects, which are not described, will be apparent to those skilled in the art to which the present invention pertains, from the following detailed description of the present invention.

What is claimed is:

1. A method of performing paging by a base station in a wireless communication system, the method comprising:
   generating a paging advertisement message, the paging advertisement message includes a paging group identifier (ID) bitmap indicating whether paging information for each paging group that includes the base station is included in the paging advertisement message; and
   transmitting the paging advertisement message to mobile stations,
   wherein a number of bits of the paging group ID bitmap is the same as a number of the paging groups, and
   wherein the paging advertisement message further includes paging cycle information indicating a paging cycle for mobile stations to be paged.

2. The method of claim 1, wherein the paging advertisement message further includes a field indicating a number of the mobile stations to be paged for each of the paging groups.

3. The method of claim 1, wherein the paging advertisement message further includes information of each of the mobile stations to be paged for each of the paging groups.

4. The method of claim 3, wherein the information of each of the mobile stations includes an action code field indicating action requested from the base station to each of the mobile stations, the action includes performing network re-entry or performing ranging for location update.

5. The method of claim 1, wherein the paging advertisement message further includes an extension flag field indicating whether a listening interval has been extended.

6. A method of performing paging by a mobile station in a wireless communication system, the method comprising:
   entering an idle mode; and
   receiving a paging advertisement message, the paging advertisement message includes a paging group identifier (ID) bitmap indicating whether paging information for each paging group that includes a base station is included in the paging advertisement message,
   wherein a number of bits of the paging group ID bitmap is the same as a number of the paging groups, and
   wherein the paging advertisement message further includes paging cycle information indicating a paging cycle.

7. The method of claim 6, wherein the paging advertisement message further includes a field indicating a number of mobile stations to be paged for each of the paging groups.

8. The method of claim 6, wherein the paging advertisement message further includes information of mobile stations to be paged for each of the paging groups that include mobile stations.

9. The method of claim 8, wherein the information of each of the mobile stations includes an action code field indicating action requested from the base station to the mobile stations, the action includes performing network re-entry or performing ranging for location update.

10. The method of claim 6, wherein the paging advertisement message further includes an extension flag field indicating whether a listening interval has been extended.

11. A base station comprising:
   a processor configured to generate a paging advertisement message, the paging advertisement message includes a paging group identifier (ID) bitmap indicating whether paging information for each paging group that includes the base station is included in the paging advertisement message; and
   a transmitting module configured to transmit the paging advertisement message to mobile stations,
   wherein a number of bits of the paging group ID bitmap is the same as a number of the paging groups, and
   wherein the paging advertisement message further includes paging cycle information indicating a paging cycle for mobile stations to be paged.

12. The base station of claim 11, wherein the paging advertisement message further includes a field indicating a number of the mobile stations to be paged for each of the paging groups.

13. The base station of claim 11, wherein the paging advertisement message further includes information of each of the mobile stations to be paged for each of the paging groups.

14. The base station of claim 13, wherein the information of each of the mobile stations includes an action code field indicating action requested from the base station to each of the mobile stations, the action includes performing network re-entry or performing ranging for location update.

15. The base station of claim 11, wherein the paging advertisement message further includes an extension flag field indicating whether a listening interval has been extended.

16. A mobile station comprising:
   a processor configured to set the mobile station to enter an idle mode; and
   a receiving module configured to receive a paging advertisement message, the paging advertisement message includes a paging group identifier (ID) bitmap indicating whether paging information for each paging group that includes a base station is included in the paging advertisement message,
   wherein a number of bits of the paging group ID bitmap is the same as a number of the paging groups, and
   wherein the paging advertisement message further includes paging cycle information indicating a paging cycle.

17. The mobile station of claim 16, wherein the paging advertisement message further includes a field indicating a number of mobile stations to be paged for each of the paging groups that include mobile stations.

18. The mobile station of claim 16, wherein the paging advertisement message further includes information of the mobile stations to be paged for each of the paging groups that include mobile stations.

19. The mobile station of claim 18, wherein the information of each of the mobile stations includes an action code field indicating action requested from the base station to each of the mobile stations, the action includes performing network re-entry or performing ranging for location update.

20. The mobile station of claim 16, wherein the paging advertisement message further includes an extension flag field indicating whether a listening interval has been extended.

* * * * *